United States Patent [19]

Williams

[11] Patent Number: 5,091,077
[45] Date of Patent: Feb. 25, 1992

[54] TROMMEL MATERIAL AIR CLASSIFIER

[76] Inventor: Robert M. Williams, 16 La Hacienda, Ladue, Mo. 63124

[21] Appl. No.: 594,053

[22] Filed: Oct. 9, 1990

[51] Int. Cl.$^5$ .............................................. B07B 9/00
[52] U.S. Cl. ..................................... 209/12; 209/24; 209/152; 209/930
[58] Field of Search ............... 209/12, 21, 24, 25, 209/38, 39, 930, 32, 33, 152, 243, 247, 284, 44.2, 44.3, 295, 22, 23; 241/DIG. 38

[56] References Cited

U.S. PATENT DOCUMENTS

| | | | |
|---|---|---|---|
| 4,139,454 | 2/1979 | Larson | 209/12 |
| 4,176,055 | 11/1979 | Corrigan | 209/152 |
| 4,222,502 | 9/1980 | Gubitose et al. | 222/411 X |
| 4,278,532 | 7/1981 | Birch et al. | 209/19 |
| 4,549,660 | 10/1985 | Werling | 209/44.3 |
| 4,553,977 | 11/1985 | Fry | 209/12 |

FOREIGN PATENT DOCUMENTS

| | | | |
|---|---|---|---|
| 2040735 | 9/1980 | European Pat. Off. | 209/38 |
| 1230809 | 9/1960 | France | 209/24 |
| 0157378 | 12/1979 | Japan | 209/23 |
| 128383 | 11/1928 | Switzerland | 209/12 |

Primary Examiner—Donald T. Hajec
Attorney, Agent, or Firm—Gravely, Lieder & Woodruff

[57] ABSTRACT

A waste material classifier apparatus which employs a rotary trommel for stirring up the waste material in an air stream so that the conglomeration of waste is easily sorted into dirt and small particles easily sifted through the trommel pores, with air sensitive paper and plastic carried out to a collection zone and large, heavy metallic objects thrust out of the trommel and run through both a magnetic separator and an induction conveyor head stock to sort out the metallic trash according to its magnetic and non-magnetic characteristics.

6 Claims, 3 Drawing Sheets

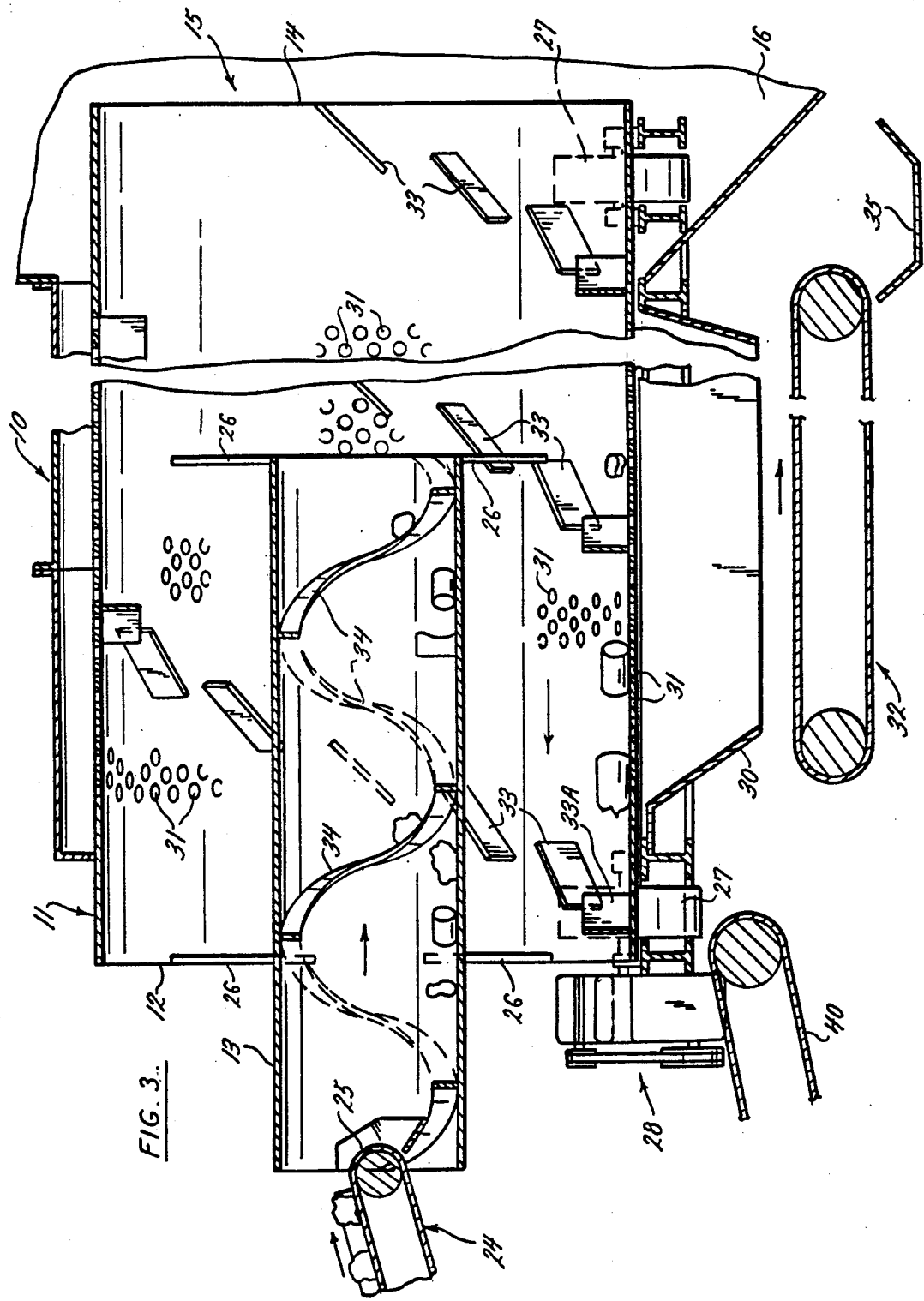

TROMMEL MATERIAL AIR CLASSIFIER

BACKGROUND OF THE INVENTION

1. Field of the Invention

This invention is directed to the use of a trommel for efficiently classifying waste material into several different categories on a high volume schedule.

2. Description of the Prior Art

Trommels are well known as devices for screening waste material into fine and course fractions. A typical trommel is a large diameter tube with an axis of rotation on a slope so that gravity impells the material. The trommel wall is perforated with openings so that the fine material can fall through. The inner surface of the trommel is provided with vanes which lift and mix the material as the tube rotates.

The trommel, as defined in the American Heritage Dictionary, Copyright 1973 Edition, page 1375, is a revolving cylindrical sieve used for sizing rock and ore. The word comes from German Trommel, barrel, drums, from trommel, drum, akin to Middle Dutch tromme drum.

BRIEF DESCRIPTION OF THE INVENTION

The apparatus to be described hereinafter is operated to perform several important objects which include the separation of fine particulate matter, the separation from the fine particulate the air responsive light weight fractions, and the segregation of heavy and bulky fractions that have been substantially stripped of the fines and air responsive fractions.

It is a further object of the invention to employ a trommel in a unique position in which it is substantially level so as not to depend upon gravity to effect movement during rotation.

Still another object of the invention is to feed a volume of waste material into one end of a rotating trommel along with a flow of air, and tumble the material in such a manner that the dirt and fine fractions are dislodged from the material, the air responsive fractions are moved through the trommel to expand into a receiving space for release from the air flow, and to move the heavy fraction in a direction reverse to the flow of the fines and air responsive fractions for collection outside of the trommel.

Another object of the invention is to process the collection of heavy fractions in a primary classification stage so as to segregate the magnetic metals, the non-magnetic metals, and the glass and plastic fractions in a secondary classification stage of waste material handling.

It is also an object of the present invention to operate a rotary trommel with means to tumble the material through an air stream which effects an efficient, low cost, sorting of a mass of waste material so that sortation is performed by weight and sensitivity to bouyancy in an air stream Other objects will be pointed out in the description of a presently preferred embodiment of apparatus as set forth in the drawings, wherein:

BRIEF DESCRIPTION OF THE DRAWINGS

FIG. 3 is a dimensionally enlarged and longitudinal sectional view of the material sortation in the trommel and the inlet auger in combination with portions of the enclosure and conveyor means, the view being taken along line 3—3 in FIG. 2.

DETAILED DESCRIPTION OF APPARATUS

Figure 1:
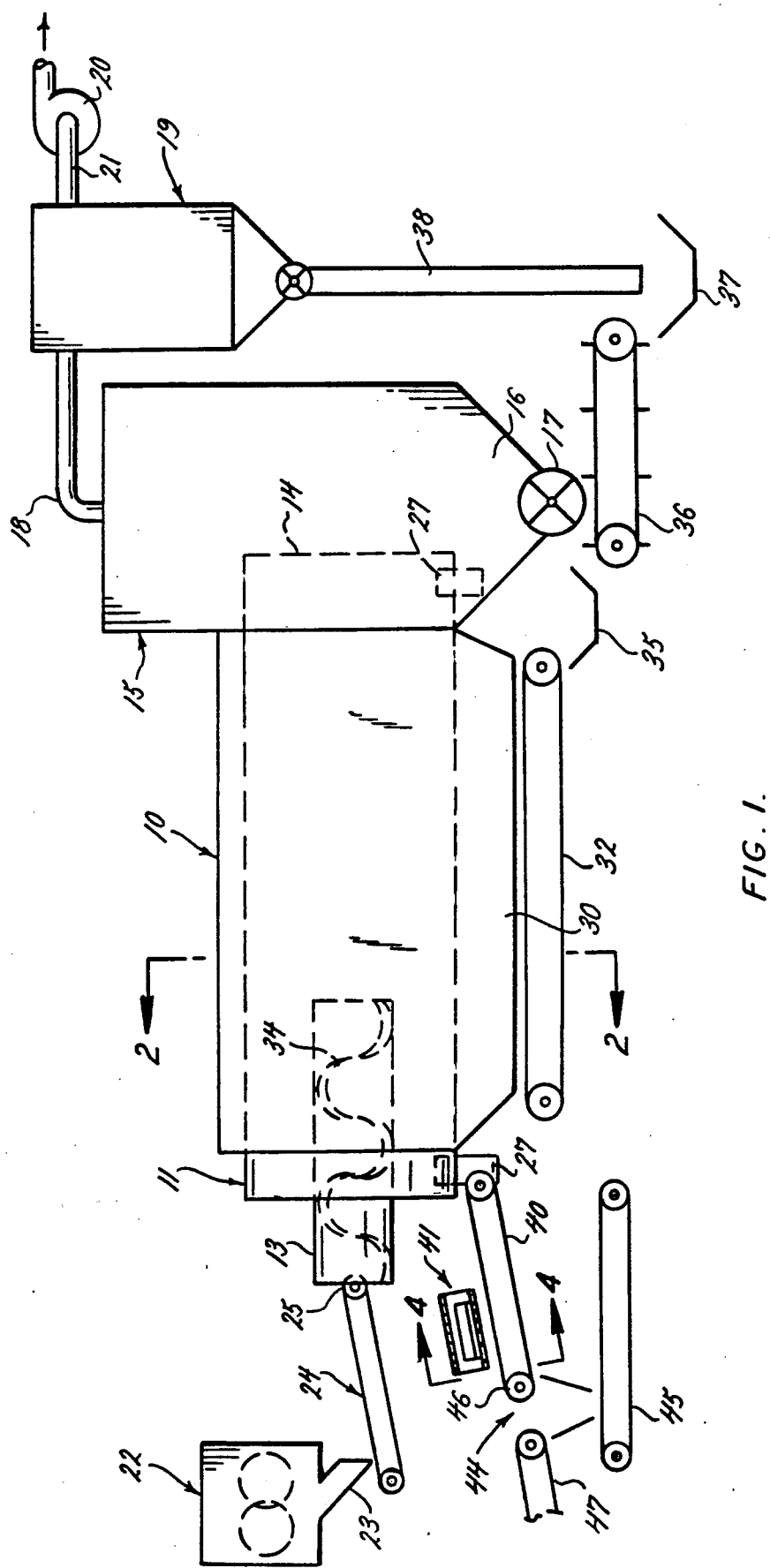
FIG. 1 is a longitudinal schematic view of an air classification employing an enclosed trommel with its inlet end shown exposed to the exterior and its outlet end opening into a volume expansion space connected by a conduit to a bag house with a suction blower and classification accessories.

The apparatus seen in FIG. 1 combines a housing or bottom open enclosure 10 for a horizontally positioned rotary trommel 11 whose inlet end 12 is exposed to receive an auger tube 13 supported centrally in the inlet end 12 of the trommel 11. The trommel outlet end 14 opens into an enlarged enclosed chamber 15 having a bottom material collector space 16 equipped with a rotary air lock gate 17. The chamber space 15 is provided with an air exhaust conduit 18 connected to a bag house 19 for the collection of fine solid material that may be drawn into the air flow to the bag house by the action of the air exhaust blower 20 connected by the conduit 21 to the bag house 19.

The trash, dirt and waste material to be subjected to the classifying or sortation action of the apparatus seen in FIG. 1 is delivered from a flail type mill 22 which breaks open bags and containers used to hold the trash material that is picked up and delivered to the present apparatus. The outlet 23 from the mill 22 directed the material onto a suitable belt conveyor 24 whose outlet delivery end 25 is disposed in the auger tube 13.

Figure 2:
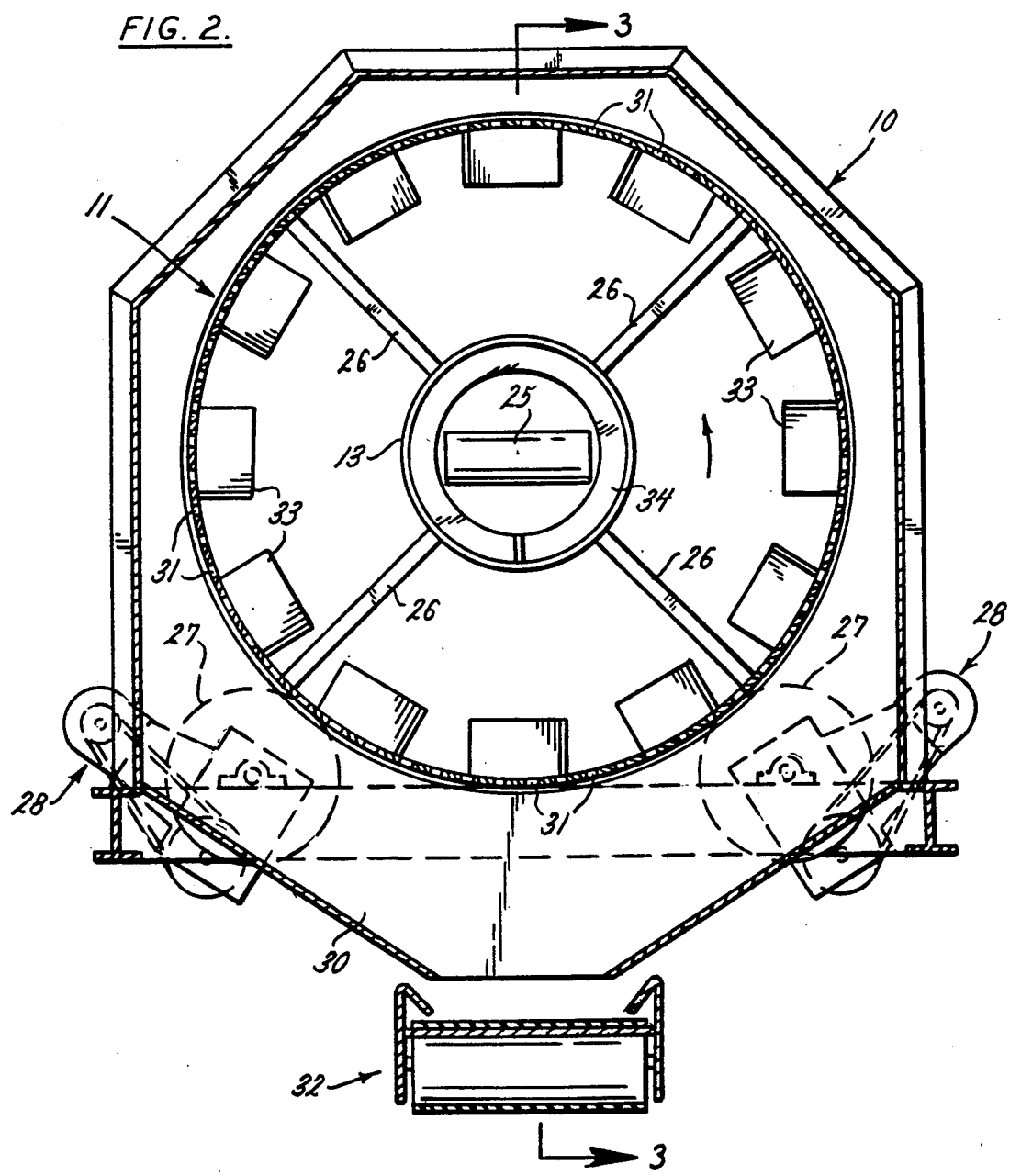
FIG. 2 is a transverse sectional view taken along line 2—2 in FIG. 1 to show a typical roller drive for rotating the trommel while cradled on rollers, and an internal system of material sortation devices.

Now looking at FIG. 2, the auger tube 13 is supported by a system of arms 26 at the trommel inlet end 12. In the usual manner, the trommel is supported on an assembly of cradle rolls 27, only a pair thereof being seen in FIG. 2. Each assembly is operated by a suitable motorized drive generally indicated at 28. The cradle rolls and drive are at least partly disposed in the housing or enclosure 10 in position so as not to interfere with the bottom outlet 30 of the enclosure 10. That outlet 30 directed the fine material which is sifted out of the trommel screen opening 31 (See FIG. 3) onto a suitable conveyor 32.

The interior of the trommel 11, as seen in FIGS. 2 and 3 is provided with a system of lifting vanes 33 spaced around the inner surface in a spirallying relationship and with the vanes 33 angularly pitched to deflect the large objects in a direction counter to the pitch of the flights 34 in the auger 13. Since the auger and trommel rotate together, the auger flights 34 move or advance the incoming material from conveyor delivery end 25 rightwardly into the trommel where the vanes 33 function to elevate the large objects and cause them to break up dirt and objects stuck together before the larger objects move leftwardly toward the inlet end 12. During the rotation of the trommel, the dirt and small fractions are caused to sift through the screen openings 31 where it is collected on the conveyor 32 for movement to a discharge chute 35. The light weight fractions introduced into the trommel 11 through the auger 13 are drawn down the central area of the trommel by the air flow created through the suction effect of the blower 20. As that material enters the enlarged chamber 15 it will slow up and sink to the bottom collector space 16 and be drawn through the rotary action of the air lock 17 for deposit on a further conveyor 36 which moves it to a discharge chute 37. Concurrently, the fine fractions collected in the bag house 19 are discharged through a rotary air lock valve and directed by a suitable conduit 38 (See FIG. 1) onto the chute 37.

While the trommel 11 performs a sortation function to discharge fines through the openings 31, it propells the large components by the vanes 33 reversely through the trommel 11, the exhaust blower 20 creates an air flow through the trommel to effect sortation of the light weight material. The heavy and larger sized fractions propelled by the vanes 33 pass under the auger 13 and are forced by the vane 33 A (See FIG. 3) to move out of the trommel end 12 and fall onto a conveyor 40. What is left after the sortation of dirt, fines and air responsive matter, is glass, plastic and metallic material of both magnetic and non-magnetic character. Thus, the sortation in the trommel is effected on the basis of weight. Sensitivity to air flow and size which is in the category of weight.

Figure 4:
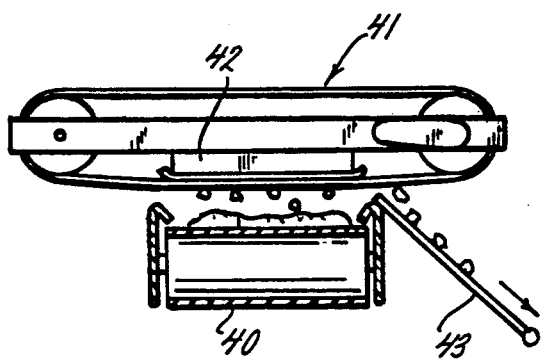
FIG. 4 is an enlarged view of the apparatus for segregating magnetic and non-magnetic metals from bottles and plastic material, the view being taken along line 4—4 in FIG. 1.

Considering the disclosure of FIGS. 1, 3 and 4, the weight and size sortation includes glass, bottles, heavy plastic PVC material, and metal containers. That collection of waste material is pushed out of the trommel by vane 33A and falls onto conveyor 40 which passes under a transverse conveyor 41 which encloses a magnetic head 42. The material has by the time it reached that conveyor 40, been substantially freed of dirt, will more efficiently respond to the magnet 42 so that the magnetic metals will be separated and pulled off to a discharge chute 43. The remainder of the material will reach a gap 44 and fall onto a collection conveyor 45. As the material falls, an induction magnetic head pulley 46 will cause the non-magnetic components to be repelled from the waste falling through the slot 44, such repelled metallic objects will collect on conveyor 47. The waste material remaining may include glass which can be hand sorted by color before recycled.

The foregoing specification is explanatory of the apparatus which has the function of feeding a conglomeration of waste material into a feed means having an internal spiral flight for moving or propelling upon its rotation the waste material into a trommel where the waste material is subjected to a classification or sortation process. The trommel is rotated on the usual power cradle rollers and the feed means rotates with the trommel to effect the movement of the waste material. The trommel is provided on its interior with an array of vanes in a spiral pattern to cause the large and heavy fractions of the waste material to be moved in a flow counter to the direction of movement of the waste material initially created by the spiral flight in the feed means. Concurrently, with the roatation of the feed means and the trommel, blower means is operated to generate an air flow through the feed means and the trommel. That air flow enters a chamber where the waste material that is sensitive to air flow is allowed to drop out of the air stream, while the air continues on to a bag house for removal of any entrained fines before the air is exhausted to the outside.

The apparatus thereby functions to classify the conglomeration of waste material into paper and light weight plastic by its sensitivity to the air flow. The rotation of the feed means and the trommel tumbles the waste material to dislodge the fine fractions in the waste which then falls by gravity through the seive holes in the trommel for collection in conveying means. The heavy and large fractions are moved by the array of spirally related vanes in a counter current direction to the air flow and exit from the trommel at its open inlet end where the feed means is mounted. That discharge of the heavy and large fractions is subjected to a further classification by magnetic means which extracts the ferrous metal, by magnetic induction means which "kicks out" out the non-ferrous metal, and the remainer is usally an assortment of glass and plastic bodies which can be picked over by hand to separate the glass by color or other characteristic.

However, the principal classification is into waste that is sensitive to air flow, into dirt and fine material, and into heavy and large size waste is performed by the rotary action of the trommel assisted by its feed means, and the creation of an air flow through the trommel. These are the primary classes of waste usually present in the waste material deposited in the feed means. After segregating those classes of waste material, specific separation techniques can be more efficiently carried on.

What is claimed is:

1. A trommel material air classifier system for processing waste material containing different characteristics of waste according to fineness, sensitivity to an air stream, and inert to an air stream, said classifier system comprising:
   (a) an elongated trommel having a perforated wall with opposite inlet and outlet ends and means for rotating said trommel about a substantially horizontal axis, said perforated wall extending substantially the length from said inlet to said outlet;
   (b) delivery means adjacent said trommel inlet end for forceably inserting the different classes of waste material into said trommel beyond said inlet;
   (c) air moving means adjacent to said trommel outlet end for developing an air flow through said trommel for collecting a class of waste material sensitive to air movement which passes material inert to said air flow;
   (d) mixing means in said trommel for moving the class of waste material inert to air flow counter to said delivery means toward said trommel inlet end, and distributing a fineness class of material over said perforated wall for release by gravity from said trommel; and
   (e) receiving means adjacent said trommel inlet end for said inert class of material.

2. The classifier system set forth in claim 1 wherein said delivery means is a tubular member carried by said trommel inlet while rotating therewith in said inlet end, and said tubular member includes screw flights therein to force the delivery of the different classes of waste material.

3. The classifier system set forth in claim 1 wherein said mixing means includes an array of vanes carried by said trommel in a spiral alignment for effecting movement of the inert class of waste material reversely to the air stream flow.

4. The classifier system set forth in claim 1 wherein said air moving means includes an enclosed chamber in which the waste material sensitive to air movement is released from the air flow through said tubular members.

5. The classifier system set forth in claim 1 wherein said receiving means for said inert class of material includes magnetic means to segregate magnetically responsive metallics and magnetic induction responsive metallics from non-metallic inert material.

6. Rotary classification apparatus for reducing mixed waste material into classes according to the individual material constituting the mix in the waste material, said apparatus comprising:

(a) a trommel rotatably supported on a substantially horizontal axis with an open material receiving end and an opposite outlet end, and perforations extending substantially the entire length between said ends forming said trommel into a sieve;

(b) mixed waste material feeding means for initially impelling mixed waste material into said trommel for classification into separate fractions, said feeding means extending into said trommel beyond said open receiving ends;

(c) air flow generating means connected to said trommel outlet end to draw a flow of air through said feeding means and said trommel;

(d) a series of vanes arranged in said trommel interior for impelling waste material fractions substantially inert to the air flow through said trommel in a direction counter to said impelling thereof by said impelling means and air flow to form a first class of waste material;

(e) means at said trommel outlet end providing for collecting a second class of waste material that is sensitive to the air flow through said feeding mens and trommel; and (f) collecting means adjacent said perforations in said trommel for receiving a third class of waste material released from said trommel through said perforations forming a sieve.

* * * * *